United States Patent [19]
Gregor et al.

[11] Patent Number: 5,963,574
[45] Date of Patent: Oct. 5, 1999

[54] COMPACT DIODE PUMPED SOLID STATE LASER

[75] Inventors: Eduard Gregor, Pacific Palisades; Tzeng Chen, Rancho Palos Verdes; Hans W. Bruesselbach, Monte Hido, all of Calif.

[73] Assignee: Raytheon Company, Lexington, Mass.

[21] Appl. No.: 09/063,082

[22] Filed: Apr. 21, 1998

Related U.S. Application Data

[62] Division of application No. 08/540,732, Oct. 11, 1995, Pat. No. 5,796,770.

[51] Int. Cl.$^6$ .............................. H01S 3/091; H01S 3/08
[52] U.S. Cl. ................................ 372/75; 372/92; 372/99; 372/100
[58] Field of Search ................................. 372/99, 69, 70, 372/71, 75, 92, 98, 72, 100, 108

[56] References Cited

U.S. PATENT DOCUMENTS

| | | |
|---|---|---|
| 3,821,663 | 6/1974 | Brenner ............................... 372/72 X |
| 5,117,436 | 5/1992 | Hanson ................................... 372/72 |
| 5,253,260 | 10/1993 | Palombo ................................ 372/34 |
| 5,291,504 | 3/1994 | Bournes ................................. 372/34 |
| 5,317,585 | 5/1994 | Gregor .................................. 372/35 |
| 5,796,770 | 8/1998 | Gregor et al. ......................... 372/75 |

*Primary Examiner*—Brian Healy
*Attorney, Agent, or Firm*—Colin M. Raufer; Leonard A. Alkov; Glenn H. Lenzen, Jr.

[57] ABSTRACT

A compact diode pumped laser including a nonuniform, single-or double-sided diode pumped laser head and a polarization output coupled (POC) resonator. The POC resonator employs reflections from two opposing uncrossed roof prism mirrors to produce a uniform near field and far field beam with diffraction or near diffraction limited quality. The single laser head particularly includes a laser rod, a sapphire envelope located about the rod, an area of antireflection coating located on the sapphire envelope between the rod and the diode array, and a high reflectivity nickel-plated indium layer located on the sapphire envelope on the surface thereof outside of the area of antireflection coating.

15 Claims, 2 Drawing Sheets

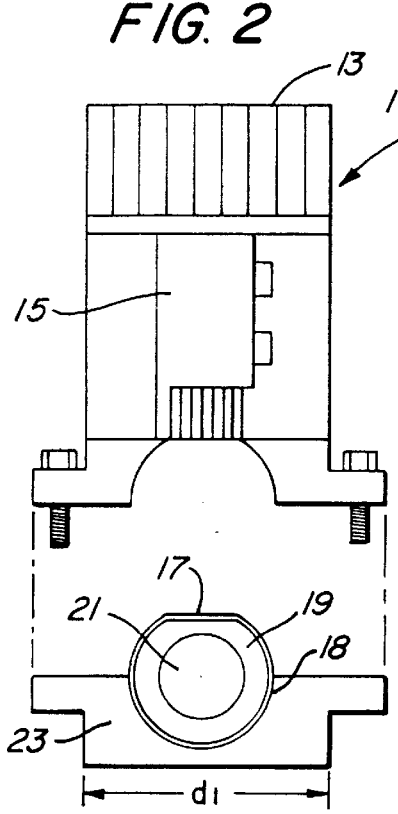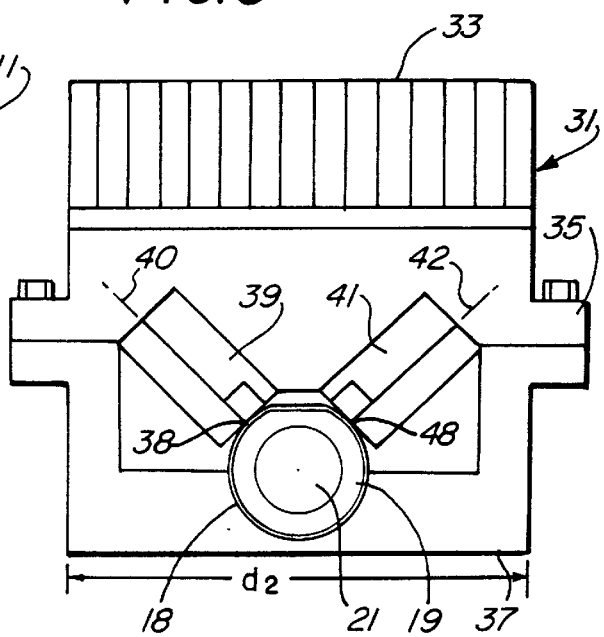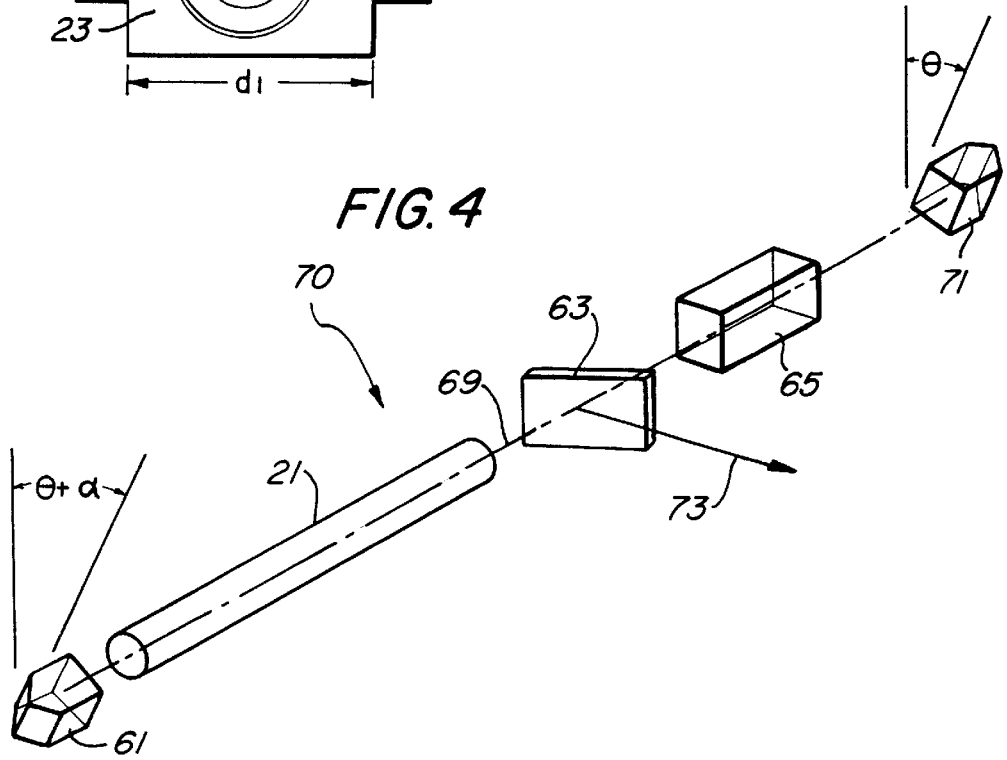

COMPACT DIODE PUMPED SOLID STATE LASER

This is a division of application Ser. No. 8/540,732 filed Oct. 11, 1995, now U.S. Pat. No. 5,796,770.

BACKGROUND OF THE INVENTION

1. Field of the Invention

The subject invention relates generally to lasers and, more particularly, to a compact, solid state diode pumped laser.

2. Description of Related Art

In previous diode pumped laser designs, especially with rod geometries, a great effort was made to provide uniform diode pumping by locating up to five or more diode arrays around the laser rod, thus creating five-sided pumping. With diode pumping, the absorption is high as compared to flash lamp pumping, since the diode output is in a narrow wavelength range at the peak absorption of the lasing material (for Nd:YAG it is 808 nm); a nonuniform inverted energy distribution results in the laser rod. By distributing the diode arrays in multiple modules around the laser rod, improved uniformity of absorption energy throughout the laser rod is achieved.

Such diode pumped lasers require a complex laser head design of relatively large size in order to mount and cool the diode arrays. Furthermore, the distance from the center of the rod to the edge of the laser head is relatively large. The relatively large distance increases the size of the folded resonator since the folded beam must clear the edge of the laser head. For breadboard and commercial lasers, which are not limited in size, this relatively large folded resonator size does not present a problem. But for military systems, small size and weight is critical, and it is in this area that the subject invention provides the greatest benefit.

OBJECTS AND SUMMARY OF THE INVENTION

It is therefore an object of the invention to improve lasers;

It is another object of the invention to provide an improved diode pumped laser;

It is another object of the invention to reduce the size and weight of diode pumped lasers;

It is another object of the invention to provide a laser head design of reduced size and weight; and Still further objects of the invention include improving the beam uniformity, the extraction uniformity, and the beam divergence of a laser.

These and other objects and advantages are achieved according to the invention by providing a compact diode pumped laser which includes a nonuniform, single- or double-sided, diode pumped laser head and a polarization output coupled (POC) resonator. The POC resonator employs reflections from two opposing uncrossed roof prism mirrors to produce a uniform near field and far field beam with diffraction or near diffraction limited quality. This POC resonator is of benefit to any nonuniform gain and thermal lasing distribution created in an active gain medium and placed inside the resonator (for example, one-sided flash lamp pumping or other means of creating nonuniform gain/thermal lasing distributions).

The novel combination of a single- or two-sided pumped laser head with a noncrossed roof prism POC resonator is of reduced size and complexity when compared to prior art multiple-sided (>2) diode pumped lasers with flat-flat mirror, flat mirror-roof prism, and crossed roof prisms resonator designs. The efficiency, the beam quality, and the alignment stability are comparable or superior to the prior art designs.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 2 is a broken-apart cross-sectional view taken at 2—2 of FIG. 1;

FIG. 3 is a cross-sectional view of a double-sided diode pumped laser head according to a preferred embodiment; and FIG. 4 is a perspective schematic view of resonator apparatus employable with the laser head structures of FIGS. 2 and 3.

DETAILED DESCRIPTION OF THE PREFERRED EMBODIMENTS

Figure 1:
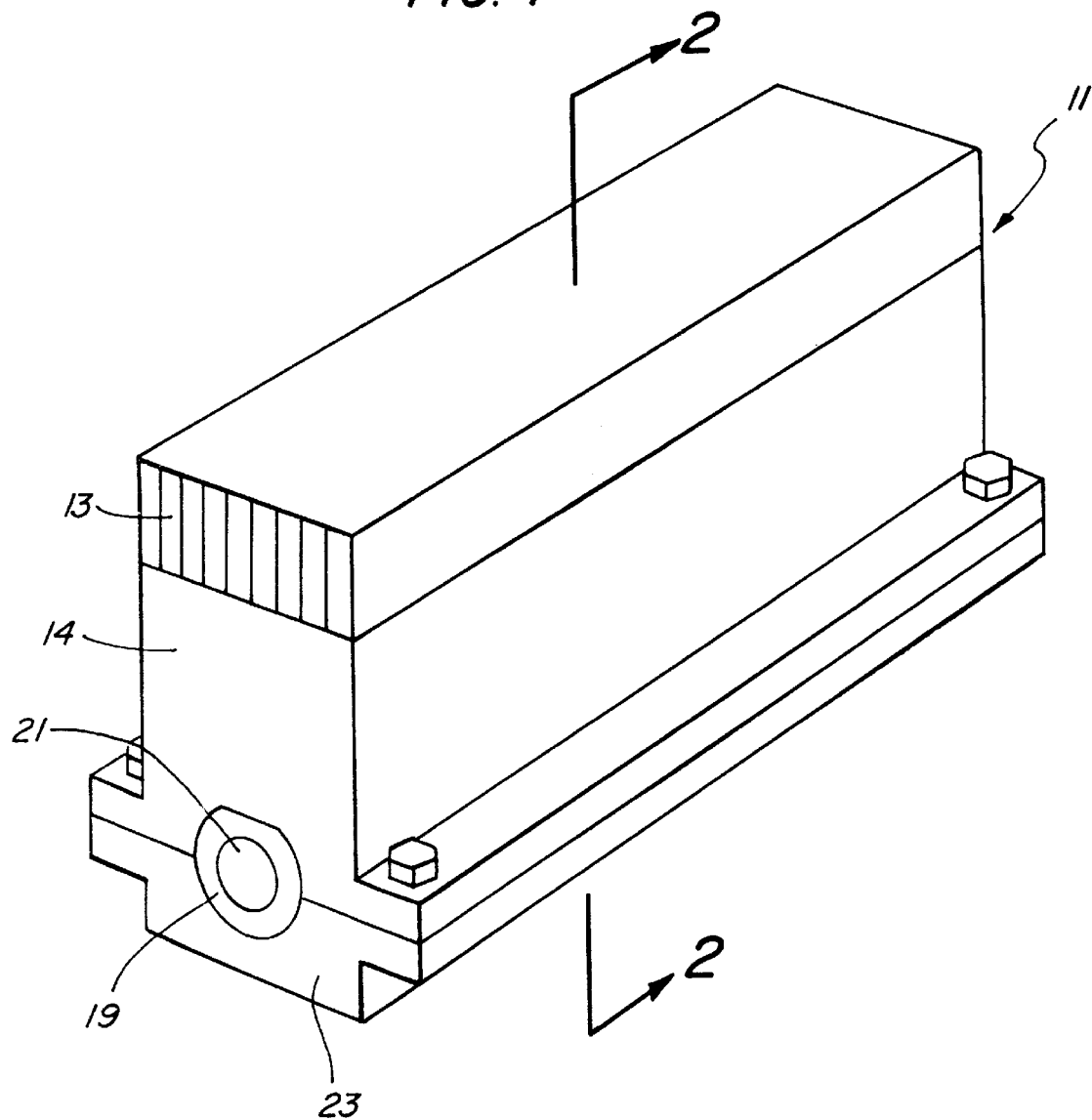
FIG. 1 is a perspective view of a single-sided diode pumped laser 5 head according to a preferred embodiment.

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a particularly compact and useful laser head and cooperating resonator design.

FIG. 1 illustrates a single-sided diode pumped laser head 11 according to a preferred embodiment. The laser head 11 includes a heat exchanger 13 mounted atop an aluminum housing 14 including an upper housing portion 16 mounted to a base 23. A pumping diode array 15 (FIG. 2) and a cylindrical laser rod 21 are located within the housing 14.

The laser rod 11 is encased in a sapphire thermal conductor envelope 19, which is of annular cross-section with the exception of a flat area 17 located just below the diodes of the diode array 15. This area 17 is coated with an antireflection (AR) coating. The thickness of the sapphire envelope 19 may be, for example, 2 millimeters (mm), while the coating of area 17 is a very thin dielectric optical coating (<10 $\mu$m in thickness).

The remainder of the sapphire envelope 19 is provided with a high reflectivity coating 18. The high reflectivity coating 18 is a dielectric coating selected to provide high reflectivity at the wavelength of the pumping diodes 15, e.g., 808 nanometers and low reflectivity at the wavelength of the coherent radiation emitted by the laser rod 21, e.g., 1.06 nanometers. Various other coating materials having various selected reflectivities may be used, depending on the particular laser medium and other design parameters, as will be apparent to those skilled in the art.

The high reflectivity coating 18 is preferably provided by a black indium foil sheet which provides an interface to absorb the 1.06-nanometer radiation, while at the same time providing a soft, black gasket or cushion between the sapphire material 19 and the aluminum of the housing base 23. The thickness of the indium foil may be, for example, 0.010-inch, and such foil is commercially available from The Indium Corp. of America, 1676 Lincoln Avenue, Utica, N.Y. 13502. The indium foil is nickel plated in a chemical bath and the surface becomes highly absorbing at 1.06 nm. To indicate the relative size of the laser head 11, the dimension $d_1$ in FIG. 1 is approximately 1.0 inch.

A two-sided pump head 31 is shown in FIG. 3. The pump head 31 of FIG. 3 again employs a heat exchanger 33 mounted atop an aluminum housing 35 having an aluminum base 37. First and second pumping diode arrays 39, 41 are positioned at approximate 45-degree angles to the horizontal, thus having axes 40, 42 located 90 degrees to each other, and their diode energy is directed through respective coating areas 38, 48, which provide low reflectivity for 808 nanometers, as in the embodiment of FIG. 2. The embodiment of FIG. 3 again employs a laser rod 21, a sapphire envelope 19, a black indium interface 18, and has a dimension "$d_2$" of approximately 1.5 inch.

The laser head shown in FIG. 2 could be cooled by liquid or air and may have two-sided pumping as shown in FIG. 3 without significant increase in size and complexity. The configuration of FIG. 2 is used as an example of the general case, which could include a liquid-cooled laser rod and diode arrays for higher power applications.

The single-sided pumped laser head 11 of FIG. 2 features reduced size. This laser head 11, when compared to prior art multiple-sided pumped heads, is about 50% smaller in size for the same power output. This single-pumped laser head 11 has a nonuniform energy absorption which is higher at the edge of the rod 21 located nearest the diode array 15. However, this nonuniformity does not affect the near field or the far field quality of the laser beam when the laser head 11 is used in a novel uncrossed roof prism POC resonator 70, which will now be described in conjunction with FIG. 4.

The resonator 70 of FIG. 4 includes a first roof prism 61 located on the optical axis 69 at one end of the laser rod 21 and a POC polarizer 63 located on the optical axis 69 at the opposite end of the laser rod 21. Beyond the polarizer 63 are located, in succession, a Pockels Cell Q-switch 65 and a second roof prism 71. The polarizer 63 splits off or directs a portion of the laser energy out of the resonator 70 to provide the output beam 73.

The resonator structure shown in FIG. 4 bears some similarities to that disclosed in U.S. Pat. No. 3,924,201. That patent discloses a laser which includes a lasing medium and two Porro prism end reflectors with the roof line of each prism being at an angle ($\ominus$) between about 5–85 degrees with respect to the plane of polarization and optically perpendicular to each other ($\alpha=90°$) to provide mechanical stability. A beam splitter is provided to direct a portion of the energy out of the system, the output power being determined by the angle of rotation of the Porro prism end reflectors.

The resonator 70 illustrated in FIG. 4 includes two Porro prism end reflectors 61, 71. In the embodiment of FIG. 4, the roof line of each prism is located at an angle ($\ominus$) with respect to the plane of polarization for optimum output coupling and are, in contrast to prior art, optically "not" perpendicular to each other ($\alpha$ 90°). This arrangement provides maximum intensity homogenization of the beam in the presence of nonuniform pumping and gain because rays in all radial positions are shifted to different radial positions on every pass. Multiple reflections in the resonator 70 therefore sweep out and sample the gain of the complete aperture of the laser rod 21. The arrangement also provides homogenization of the phase aberrations in the optical components in the resonator, including nonuniform thermally induced lasing of the gain medium.

Test results demonstrate near field and far field beam quality equivalent to six-sided pumping when the angle between the two roof lines is selected to be $\alpha=60°$. Higher homogenization has been obtained in flashlamp pumped lasers by choosing an angle which is not an integral fraction of 360 degrees; that is to say, choosing the angle so no ray ever returns to its original position. However, the beam in the near field and far field was measured to be of excellent quality in the present diode pumped embodiment with $\alpha=60$ degrees, which illustrates the principle of the invention.

One important operational parameter is the far field distribution. For the single-sided diode pumping geometry of FIG. 2, it is circularly symmetric and with a beam divergence of 1.0 milliradian. This beam quality meets designator performance requirements and is comparable to the performance of four or greater-sided pumping geometries.

In summary, those skilled in the art will appreciate that there are two features of the disclosed design which provide a significant improvement over the prior art when they are combined to form a compact diode pumped laser:

1. A highly compact, efficient, single or double diode pumped laser head in a two-part design consisting of a diode assembly and a rod assembly; and
2. An uncrossed double roof prism (POC) resonator with the angle between the two roof lines selected to optimize radial homogenizing symmetry by multiple reflections (>10 reflections).

In FIGS. 2 and 3, the rod assemblies respectively comprise components 17, 18, 19, 21, and 23 (FIG. 2); and 18, 19, 21, 37, 38, 48 (FIG. 3); and the diode assemblies respectively comprise components 13, 15, and 16 (FIG. 2); and 33, 5, 39, and 41 (FIG. 3).

It may be noted that, in general, a preferred resonator for use with laser heads constructed according to the invention may comprise any combinations of surfaces which are retroreflecting in one or both planes of incidence, the two retroreflectors being oriented relative to one another in such a way that the ray optical path does not repeat itself in the resonator, thereby leading to homogenization. Output coupling may be brought about with a polarizer as shown in FIG. 4, or by some other means, for example, such as a partially reflecting pellicle or beam splitter, a fold which consists of a partially reflective mirror, or a partially reflective surface on one of the retroreflectors.

Those skilled in the art will thus appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A laser head comprising:
   a lasing medium comprising a laser rod;
   a single pumping diode array positioned adjacent said lasing medium;
   a sapphire envelope located about said rod;
   an area of antireflection coating located between said rod and said diode array; and
   high reflectivity coating means located on said rod outside of said area.

2. The laser head of claim 1 wherein said high reflectivity coating means further provides a cushion between said sapphire envelope and a metal housing base.

3. The laser head of claim 1 wherein said high reflectivity coating means includes indium.

4. The laser head of claim 1 wherein said high reflectivity coating means comprises a nickel-plated indium sheet.

5. The laser head of claim 1, said head being positioned within a resonator comprising an uncrossed double roof prism resonator including first and second roof prisms having respective roof lines, said roof prisms comprising respective reflectors of said resonator, said first and second roof prisms having an angle between their respective roof lines selected to provide radial homogenization through multiple reflections within said resonator.

6. The laser head of claim 1, said head being positioned within a resonator, said resonator comprising any two combinations of surfaces which are retroreflecting in at least one plane of incidence, the two retroreflectors being oriented relative to one another in such a way that the ray optical path does not repeat itself in the resonator, resulting in homogenization of the output beam of said laser head.

7. The laser head of claim 1 further including a second pumping diode array positioned adjacent said lasing medium.

8. The laser head of claim 7 wherein said lasing medium comprises a laser rod and said laser head further includes:

a sapphire envelope located about said rod;

an area of antireflection coating located between said rod and said diode array; and high reflectivity coating means located on said rod outside of said area.

9. A laser head comprising:

a lasing medium embodied in a rod geometry;

a single pumping diode array positioned adjacent said lasing rod;

a sapphire envelope located about and directly abutting said lasing rod;

an area of antireflection coating located between said lasing rod and said diode array; and high reflectivity coating means locate on said sapphire envelope outside of said area;

wherein said high reflectivity coating means further provides a cushion between said sapphire envelope and a metal housing base.

10. The laser head of claim 9 wherein said high reflectivity coating means includes indium.

11. The laser head of claim 9 wherein said high reflectivity coating means comprises a nickel-plated indium sheet.

12. A laser head comprising:

a lasing rod including a lasing medium; said lasing rod having an axis extending through a center of said lasing rod; and first and second pumping diode arrays positioned adjacent said rod medium;

wherein said first and second pumping diode arrays are positioned on a same side of said axis of said lasing rod.

13. The laser head of claim 12, wherein said first and second pumping diode arrays are non-equidistantly spaced apart from one another about a circumference of said lasing rod.

14. The laser head of claim 12, wherein said first and second pumping diode arrays have respective axes lying perpendicular to one another.

15. The laser head of claim 12 wherein said laser head further includes:

a sapphire envelope located about said rod;

an area of antireflection coating located between said rod and said first and second diode arrays; and high reflectivity coating means located on said sapphire envelope outside of said area.

* * * * *